Jan. 2, 1934.   H. E. WARREN   1,942,077
LUBRICATED BEARING
Filed Oct. 19, 1931
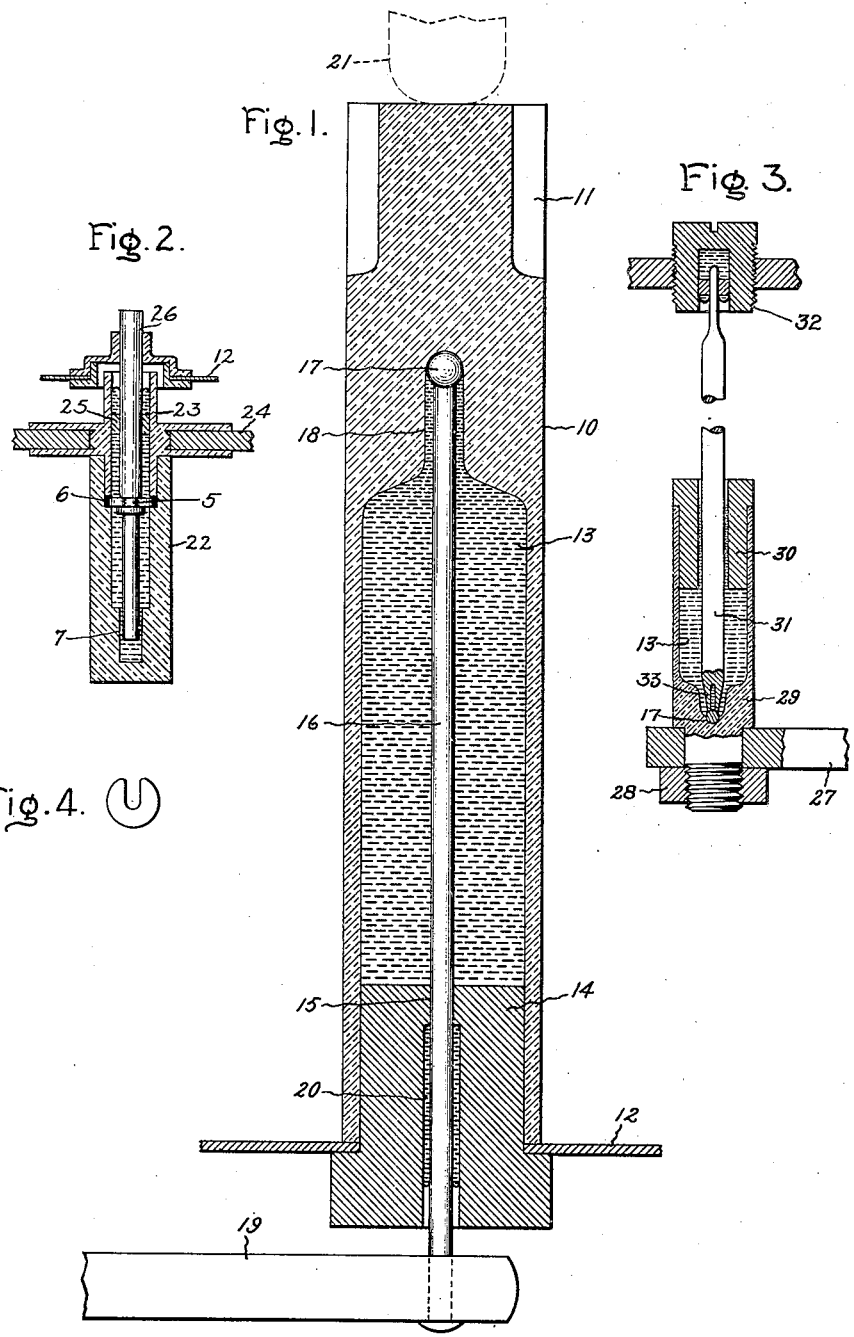
Inventor:
Henry E. Warren,
by Charles E. Tuller
His Attorney.

Patented Jan. 2, 1934

1,942,077

UNITED STATES PATENT OFFICE 1,942,077

LUBRICATED BEARING

Henry E. Warren, Ashland, Mass., assignor to Warren Telechron Company, Ashland, Mass., a corporation of Maine Application October 19, 1931. Serial No. 569,607

6 Claims. (Cl. 308—172)

My invention relates to lubricated bearings and has been particularly designed for use in electric clocks, meters and small motor-operated devices where the speed is sufficiently high as to require lubrication and where the bearing generally operates for long periods of time without attention.

In carrying my invention into effect, I provide an oil reservoir sealed with an overflow chamber in which oil is retained by capillary action. This assures that air will remain excluded from the main reservoir, while permitting expansion and contraction incident to temperature changes. The bearing structure and oil reservoir may revolve on a stationary stud and serve as the rotor shaft, carrying the rotor and drive gear pinion of the device with which it is used. With equal satisfaction the structure and reservoir may serve as a stationary bearing for a revolving shaft. This structure may to advantage be made of transparent material, such as celluloid, to facilitate inspection.

The features of the invention which are believed to be novel and patentable will be pointed out in the claims appended hereto. For a better understanding of the invention, reference is made in the following description to the accompanying drawing showing in Fig. 1 a section view of my improved lubricated bearing as designed for use with electric clock motors, Figs. 2 and 3 represent modifications using the capillary overflow feature, Fig. 2 showing a double thrust bearing and Fig. 3 a bearing suitable for vertical shaft meters, and Fig. 4 is a side view of a thrust collar used in the bearing of Fig. 2.

Referring to the drawing, Fig. 1, it will be noted that a cylindrical member 10 has a pinion gear 11 formed on one end and supports a rotor element 12 at the opposite end. The rotor element 12 may comprise the disc rotor of a small self-starting synchronous motor, and the pinion 11 may mesh with the gear train of a clock driven by such motor. Bearings substantially as represented but of materially reduced size (about one inch in length) have been successfully utilized for the above named purpose where the motor speed was 400 R. P. M. The size and speed mentioned are not intended as limitations on the invention, but to give a general idea of a practicable use of the invention. The cylindrical member 10 may be made of any suitable material, but I have found it desirable to make it of some transparent material, such as celluloid, which may be easily molded. By making the chamber transparent the inner bearing and oil chamber may be seen, thereby facilitating correct assembly and filling when first installed and inspection at any time in use. The member 10 is bored or otherwise hollowed out to provide an oil reservoir 13, and the open end is closed with a flanged metal plug 14 which is also used here to secure the rotor 12. The plug 14 has a central opening 15 into which a stationary steel pin 16 is inserted. A steel ball 17 is pressed into a central recess 18 in the upper end of the container 10 and the end of the steel pin, which is suitably shaped and polished, rests on this ball and forms a step bearing. The ball may be either fixed in the reservoir chamber 10, or it may be free to rotate in its recess. The recess 18 assists in correct assembly and prevents displacement of the pin. The steel pin 16 is rigidly supported to some stationary support, indicated at 19, which may be a part extending from the motor stator, not shown. The opening at 15 in the plug 14 forms a guide bearing of such dimensions as to permit free rotation of members 10, 12, 14 and 17 as a unit, which unit combines the purposes of rotor shaft and drive pinion, visible oil reservoir and rotary bearing parts. The parts 14, 16 and 17 should be made of metals or materials suitable for the purpose which will not chemically react with or otherwise injure the oil.

The metal plug 14 has the outer portion of its central opening enlarged as indicated at 20 to form an expansion oil chamber or reservoir in which a certain amount of oil is retained by capillary action due to the small capillary space between the inner walls of this opening and the adjacent outer surface of the pin 16.

When the bearing is assembled the chamber 13 is filled with the proper grade of lubricating oil, being careful to have most or all of the air excluded. The pin 16 is then inserted, and the oil overflow, through the guide bearing 15, fills or partially fills the capillary space 20. The container being transparent makes it easy to see whether or not air bubbles are present and to correct the matter if necessary when the reservoir is filled. The bearing is now ready for operation. If the bearing is to be operated in other than the vertical position represented, some means should be provided for preventing undesirable endwise displacement, such as a stop, indicated at 21.

Owing to changes in temperature and the resulting contraction and expansion, many oil reservoirs such as heretofore used in many clock motors and other devices have given trouble. Heretofore, the oil ejected from a reservoir at high temperature has not only been lost but has often been a source of trouble in that it soils clock dials and other exposed parts with which it comes into contact. The oil chamber has often become empty, or sufficiently so as to improperly supply the parts to be lubricated, long before the useful life of the device has expired. When this happens the bearings quickly wear out and the device becomes useless. Even though the reservoir may still contain sufficient oil, air replaces the oil lost due to expansion and tends to deteriorate and gum the oil remaining in the reservoir.

These difficulties are eliminated with my improved bearing. If the parts are raised to a reasonably high temperature, such as the highest temperature that will ordinarily be experienced in actual use, at the time the bearing is assembled and the overflow end of the expansion chamber is carefully wiped of excess oil, the oil remaining in the two chambers will be retained and will not cause trouble due to leakage. As the parts are cooled, oil from the capillary overflow chamber is drawn into the main reservoir, and this capillary space is made of sufficient capacity that the main reservoir is always kept full and never sucks air through the guide bearing 15. Thus, the auxiliary reservoir 20 serves to supply and take the overflow from the main reservoir under expansion and contraction conditions, often called "breathing". Any oil in the auxiliary reservoir 20 will flow to the inner end thereof, due to capillary action. The opening in the outer end is so small that leakage and contamination of the oil in this auxiliary reservoir due to dirt and exposure to air is negligible.

Figs. 2 and 3 show modifications of the invention where the oil reservoir is stationary. In Fig. 2, the transparent oil reservoir is indicated at 22. One end is closed by the end wall of the chamber material itself, and the other end by a hollow metal plug 23. The plug 23 is provided with lateral extensions for securing it to some stationary supporting structure, indicated at 24.
A guide bearing 25 is contained within the plug and separates the main oil reservoir from the capillary overflow chamber in the outer end of the plug. As in Fig. 1, 12 indicates the rotor element of a small motor, which in Fig. 2 is suitably secured to the rotary shaft 26. In this modification the rotary shaft 26 is grooved at 5 and a split washer, represented in side view in Fig. 4, is inserted in the groove and then clamped sufficiently to hold it in place. The outer edges of the washer fit loosely into a circular recess 6 between the inner end of the part 23 and a shoulder on part 22, and these parts serve as a double thrust bearing which maintains the shaft in a definite axial position with respect to the stationary part of the bearing and prevents the rotor shaft from dropping out after the parts are assembled. It will be evident that with this arrangement expansion and contraction of casing 22 in a lengthwise direction will not change the axial position of the rotor shaft 26 or the axial position of the rotor 12 with respect to the motor field (not shown).

The shaft 26 terminates in a recessed portion 7 of the casing 22, leaving a space opposite its end where worn particles of the shaft, or other sediment, may collect without interfering with the bearing operation. Bearings proportioned as in Fig. 2, but of less than half the size shown, have been found suitable for clock motors.
Fig. 3 shows the cylindrical reservoir 29 fixed to a stationary part 27 by being bolted thereto by the nut 28. 30 is a plug in the opposite end loosely surrounding shaft 31 leaving the capillary space continuous with the main oil reservoir. This arrangement is suitable for the lower step bearing of a vertical shaft meter. No guide bearing at the plug entrance is necessary here since we may depend upon the guide bearing at the upper end of the shaft 31 as indicated at 32. This guide bearing is likewise provided with an oil reservoir and capillary overflow chamber in accordance with my invention. In this arrangement I may make the step bearing end of shaft 31 hollow as indicated at 33 which assists in maintaining the shaft in place. The circular bearing surface at the cylindrical shaped end of the shaft has an outer diameter less than that of the ball 17. The hollowed out portion also serves as a chamber for lubricant.

The arrangements shown in Figs. 1 and 2 can be modified to have both parts rotatable and will then make an excellent bearing between two aligned shafts which rotate at different speeds or in opposite directions.

As will occur to those skilled in the art, various different arrangements and combinations of the principles described above may be employed without departing from the true spirit and scope of the invention, and I therefore do not wish to limit my invention to the particular arrangement described.

What I claim as new and desire to secure by Letters Patent of the United States, is:—

1. A bearing comprising a cylindrical compartment filled with a lubricant and having a cylindrical opening at one end thereof, and a relatively rotatable circular rod extending through said opening, the relative dimensions of said opening and rod being such that the rod substantially closes the opening and forms a guide bearing at one point and the rod is spaced apart from the interior walls of the cylindrical opening at other points to form a capillary overflow chamber for lubricant from said compartment.

2. A bearing comprising a cylindrical compartment of transparent material forming an oil reservoir, a guide bearing through one end of said compartment, a relatively rotatable circular rod extending through said guide bearing into said oil reservoir, the parts being dimensioned to form a cylindrical capillary space about said rod outside of said guide bearing serving as an overflow chamber for said oil reservoir.

3. A bearing comprising a cylindrical compartment of transparent material closed at one end by a wall of the material itself and at the other end by a metal plug, the compartment thus formed serving as a reservoir for lubricant, a thrust bearing supported in said reservoir at the end opposite the plug, a central opening in the plug in alignment with the thrust bearing, and a relatively rotatable circular rod extending through said opening and reservoir to said thrust bearing, the relative dimensions of the opening in said plug and of the rod being such as to form a guide bearing for the rod at the inner end of the plug, and a capillary space between the plug and rod outside of the guide bearing which serves as an overflow chamber for lubricant from the compartment.

4. A bearing comprising a rotatable hollow cylindrical body of transparent material, such as celluloid, closed at one end by the material itself, an inner central thrust bearing at said end, the other end of said body being closed by a metal plug provided with a central opening aligned with the thrust bearing and by a stationary circular rod extending through said opening to the thrust bearing, the rod fitting the opening in the plug to form a guide bearing at one point, the enclosure thus formed serving as a reservoir for lubricant for the thrust and guide bearings, the plug and rod being spaced apart external to the guide bearing to form a cylindrical capillary space serving as an overflow chamber for lubricant from said reservoir.

5. A bearing structure comprising a hollow rotary cylindrical member of transparent material, such as celluloid, said member serving as a hub for a rotor element and as an oil reservoir, a stationary rod extending into said cylindrical member on its axis, bearing surfaces between said rod and member supplied with oil from said reservoir, and means extending from said member about said rod exterior to the reservoir, forming with said rod a cylindrical capillary space which serves as an expansion chamber for oil from said reservoir.

6. A bearing structure comprising a hollow one-piece cylindrical body closed at one end, a bearing in the internal surface of said closed end, a closure piece for the other end of said cylindrical body having a central opening forming a guide bearing in alignment with the first mentioned bearing, a relatively rotatable circular rod extending through said guide bearing to the first mentioned bearing, said hollow cylindrical body being made of transparent material and forming a reservoir for lubricant contained therein as well as the exterior supporting housing for said bearing structure whereby the amount and condition of the lubricant in said reservoir may be seen through the walls of said housing after the bearing structure is completely assembled for use.

HENRY E. WARREN.